Nov. 23, 1965    S. D. SCHELL    3,218,707
ELECTRIC DRY SHAVER OF THE OSCILLATING BLADE TYPE
Filed Sept. 6, 1963    3 Sheets-Sheet 3
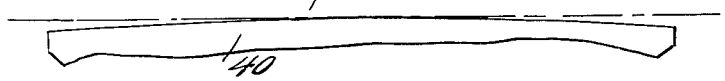
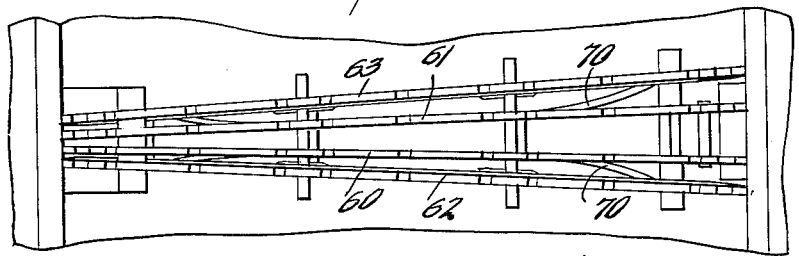
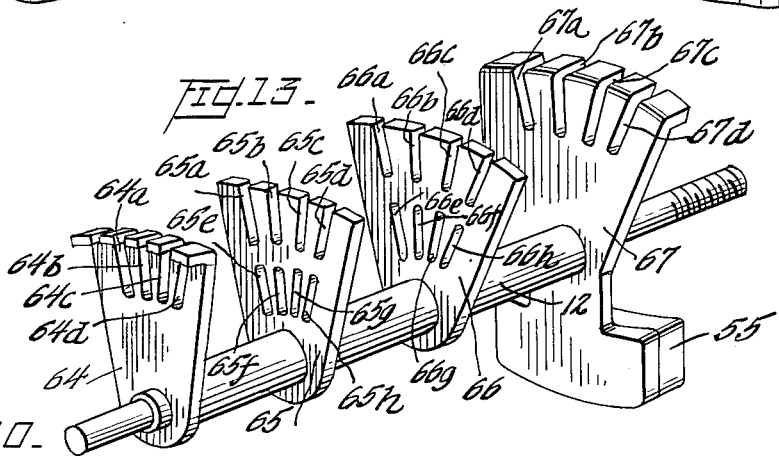
Action of Blades per Prior Art.    Action of Blades per Applicant.
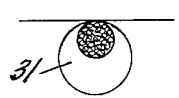 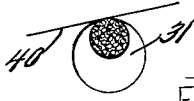
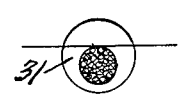 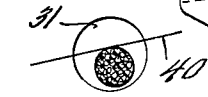
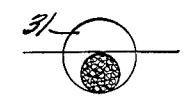 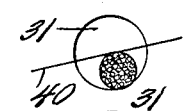
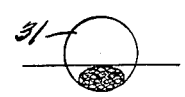 
 
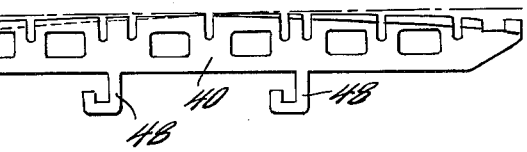
INVENTOR
Samuel D. Schell,
BY Samuel Stearman
ATTORNEY United States Patent Office 3,218,707
Patented Nov. 23, 1965

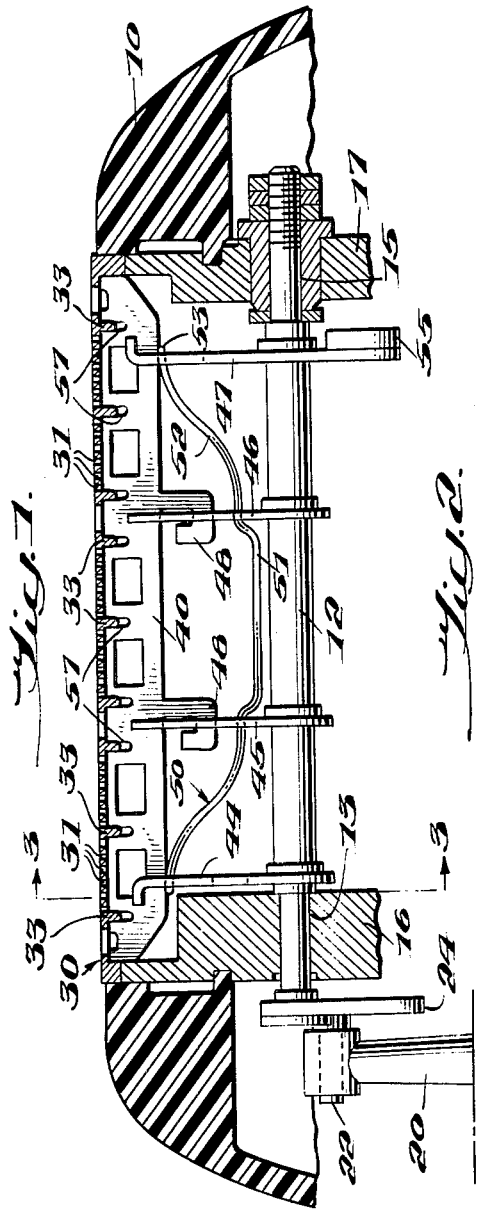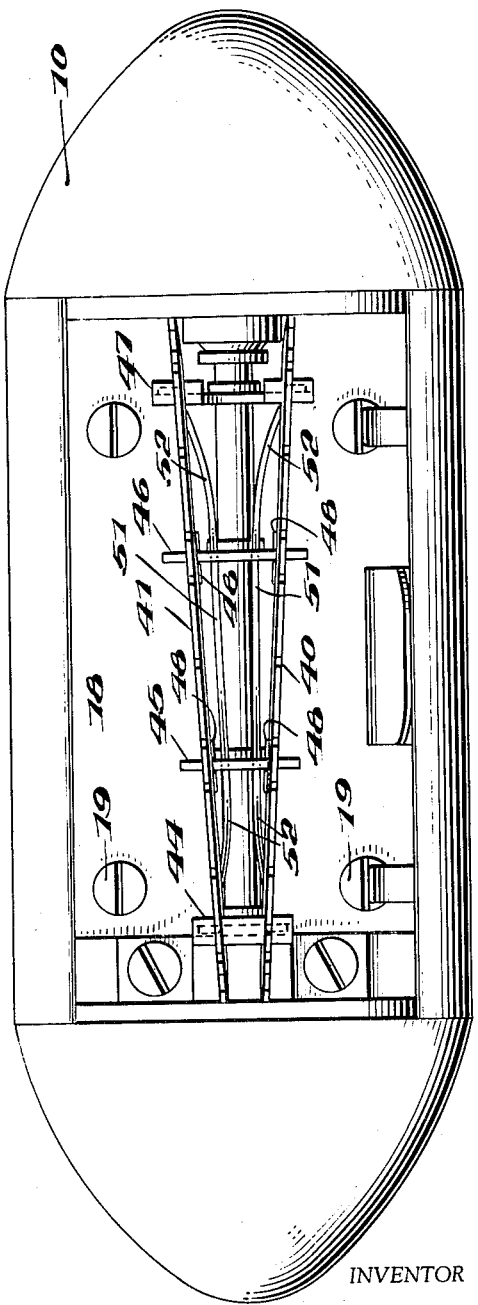
INVENTOR
SAMUEL D. SCHELL,
BY Samuel Steanman
ATTORNEY

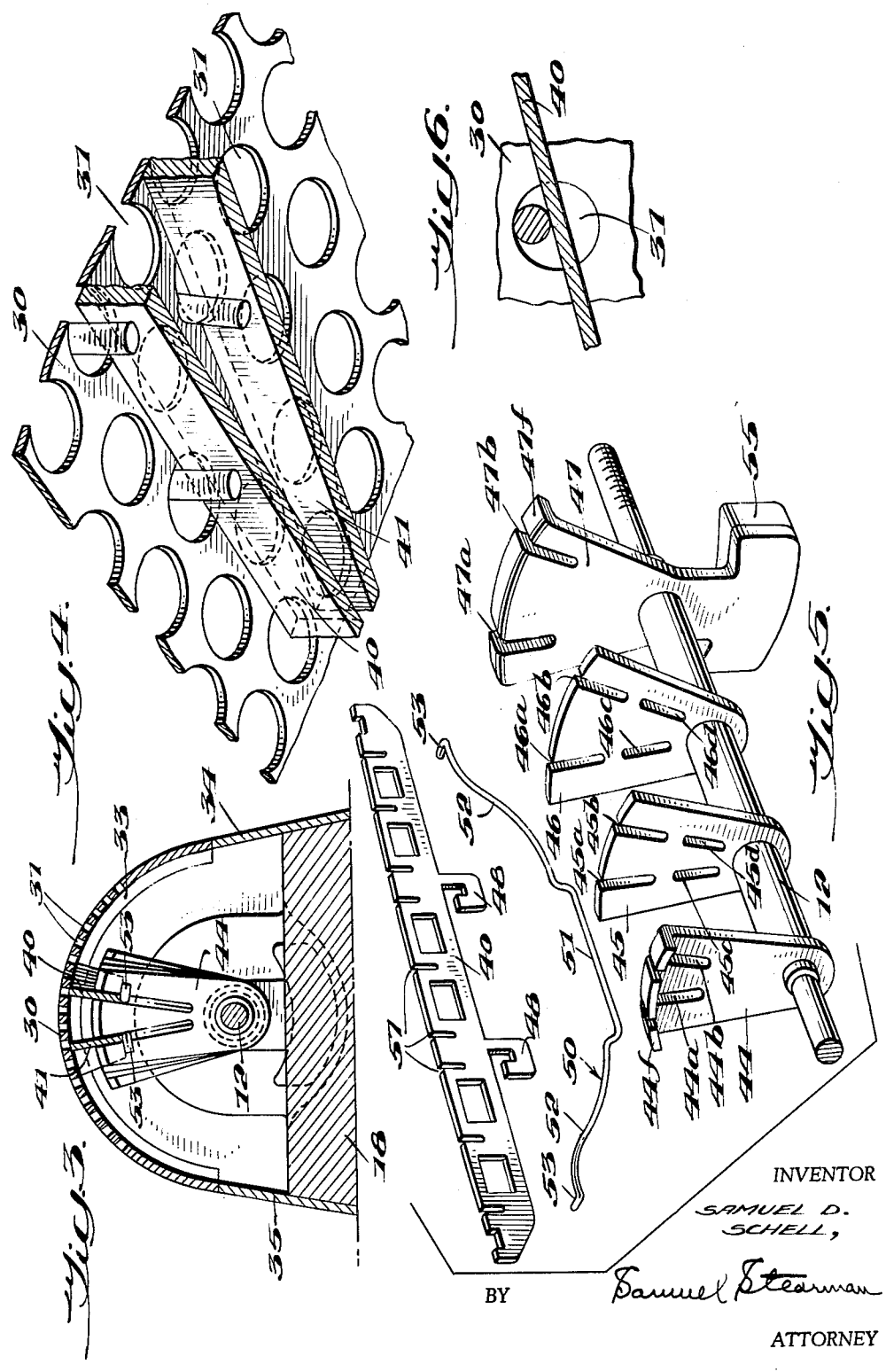

3,218,707
ELECTRIC DRY SHAVER OF THE
OSCILLATING BLADE TYPE
Samuel D. Schell, 1901 Columbia Road NW.,
Washington, D.C.
Filed Sept. 6, 1963, Ser. No. 307,090
7 Claims. (Cl. 30—43.7)

This invention relates to dry shavers of the electrically operated type, and is more particularly concerned with improvements in electrically operated dry shavers of the type in which the cutting blades are mounted for oscillating movement in cooperation with the concave inner surface of an arcuate-shaped comb or grill.

The desideratum in electric shavers is, of course, to enable the user to achieve rapid and satisfactory shaving of the hair of the face and other skin areas, without thereby incurring irritation or other discomfiture of the skin.

In electric shavers of the oscillating type, such as that shown in the patent to Jepson No. 2,797,479, the cutting blade or blades are mounted so that they extend in a direction parallel to the axis of the arcuate-shaped comb and cooperate, during their oscillating movement, with the inner surface of the comb to cut off the hairs which project through the openings or perforations in the comb when the outer surface of the latter is lightly pressed against and moved across or around the surface of the skin from which hair is to be shaved. In such a shaver construction, the cutting edges of the blades operate at right angles to the direction of movement of the blades. As a result, the hairs, being of fibrous structure, are pinched off or squeezed off with mangling of the ends of the hairs, rather than being sliced off. The mangling and squeezing or pinching off of the hairs not only results in irritation of the skin but also causes the skin to feel rough after shaving.

In my prior Patent No. 2,931,099, there is disclosed and claimed a dry shaver of the oscillating type which constitutes an improvement of the previously known electric shavers of this type in that it makes possible a shearing or slicing action by the cutting edges of the blade, thus enabling the hairs to be cleanly sliced without mangling the ends thereof, in contrast to the pinching off or squeezing off of the hairs as in the case of the previously known dry shavers of this type. In accordance with my aforesaid prior patent, the shearing or slicing action is obtained by means of an arrangement wherein the cutting edges of the blade or blades diverge from one another along the length of the blade. By that arrangement, one end of the cutting edge trails the opposite end thereof in either direction of oscillation of the blade, thereby providing a slicing action upon the hairs projected through the openings in the comb when each cutting edge crosses such openings in the comb in either direction of oscillation of the blade.

The divergence of the cutting edges which results in aforementioned slicing action is obtained in my aforesaid prior patent by means of a pair of blades, each of which has its cutting surface tapering in width along its length, and by positioning the blades in the shaver so that the direction of taper of the cutting surface of one of the blades extends oppositely to the direction of taper of the cutting surface of the other blade.

Although effective in yielding a slicing rather than a pinching or squeezing action on the individual hairs, the tapered configuration of the blades of my prior patent requires that they have a relatively wide cutting face. This entails not only a difficult manufacturing task, but such relatively wide cutting faces render difficult the honing of the cutting edges to maximum efficiency and the maintenance of maximum surface contact with the inner surface of the comb during operation of the shaver.

The principal object of the present invention is to provide a further improvement upon the oscillating type of dry shaver.

Another object of the invention is to provide an improved shaver of this type, constructed to operate by exerting a shearing action upon the hairs to be shaved.

More particularly, it is an object of the invention to provide a shaver of the aforesaid type, wherein the cutting blades are each of uniform, as distinguished from tapering, thickness.

Still another object of the invention is to provide an improved form of electric shaver of the character aforesaid, so constructed as to enable the cutting blades to be self-honed during operation of the shaver.

Still another object of the invention is to provide an assembly of blades, supporting members and springs for biasing the blades to operative position, the assembly being such as to enable it to be utilized as the oscillating cutter head assembly of the well-known Sunbeam "Shavemaster" shaver, either as the original cutter head component thereof or as a replacement for the cutter head assembly of such shavers presently in use.

The foregoing and other objects of the invention will be more clearly apparent from the detailed description below and from the accompanying drawings, in which:

FIG. 1 is a view partly in elevation and partly in cross-section, taken longitudinally of the cutting head of a shaver embodying the invention;

FIG. 2 is an enlarged top plan view thereof, with the comb or grill omitted in order to show more clearly the arrangement of the cutter blades;

FIG. 3 is a vertical cross-section taken along line 3—3 of FIG. 1 and looking in the direction of the arrows;

FIG. 4 is a fragmentary view on a greatly enlarged scale of the preforated comb and the cutter blades associated therewith according to the convention;

FIG. 5 is an exploded perspective view of certain of the parts;

FIG. 6 is a greatly enlarged fragmentary view illustrating diagrammatically the relationship between a cutting edge of one of the blades and one perforation of a comb in securing the slicing action obtained according to the invention;

FIG. 7 is a fragmentary view of one of the blades in side elevation, depicting the lengthwise contour of the cutting face of the blade in greatly exaggerated form;

FIG. 8 is a side view of one of the blades, depicting the helical formation at the cutting face of the blade in magnified and exaggerated form;

FIG. 9 is a view of the blade taken endwise of FIG. 8;

FIG. 10 is a view diagrammatically illustrating in greatly enlarged form the pinching or squeezing of the individual hairs which occurs by the action of the blades of electric shavers of the prior art;

FIG. 11 is a view similar to and comparable with FIG. 10, illustrating the slicing or shearing of the individual hairs which occurs by the action of the blades in the electric shaver of the present invention;

FIG. 12 is a fragmentary view, in enlarged top plan and similar to FIG. 2, but showing another embodiment of the invention; and FIG. 13 is a view in perspective, similar to the portion of FIG. 5 showing the corresponding parts of the shaver of FIGS. 1 to 5, but showing those parts modified for use in the embodiment shown in FIG. 12.

Stated briefly, the aforesaid objects and advantages of the invention are achieved by the provision of a shaver of the oscillating blade type, wherein the blades oscillate in cooperation with the inner surface of a semi-cylindrical comb and are yieldingly held in slotted, spaced blade-supporting members mounted on an oscillatable shaft, the blades being disposed so as to diverge gradually with respect to one another at a relatively small angle, from one end to the opposite end thereof. Furthermore, in accordance with the invention, each of the blades has its cutting face formed along a slightly convex arc and extending along a slightly helical path, in the lengthwise dimension thereof.

Referring to the drawings, it is pointed out that they illustrate only those portions of the shaver which are necessary to an understanding of the improvements constituting the present invention. Reference may be had to the above mentioned Patent No. 2,797,479 for disclosure of other components of a shaver of the type to which the present invention relates.

In the drawings, reference numeral 10 indicates the upper portion of a casing in which the working parts of the shaver are housed. A shaft 12 is mounted for oscillation in bearings 13 and 15 extending, respectively, through supporting standards 16 and 17 formed on or suitably fastened to the ends of a base plate 18 extending longitudinally of the upper end of the casing and fastened in placed as by screws 19.

The shaft is caused to oscillate by a connecting rod 20 connected to a crank pin 22 mounted eccentrically at one end of the shaft on a crank arm 24. The opposite end of the connecting rod 20 may be connected by any suitable means (not shown) as, for example, a crank arm and pin, to the shaft of a motor housed in the casing, thereby causing oscillation of the shaft 12.

The comb 30 is of transversely arcuate namely, semi-cylindrical configuration (see FIGS. 1 and 3) and is composed of relatively thin flexible material formed with a large number of spaced openings 31 throughout its cutting surface and adapted to serve as hair receiving openings. The comb may be formed of stainless steel or other material adaptable for the purposes. Because of the thinness of the material of which the cutting surface is composed, it is provided along its inner or under face with a plurality of longitudinally spaced arcuate reinforcing ribs 33 parallel to one another. As will be understood, the comb is detachably engaged along one of its longitudinal edges with a plate 34 hinged to the casing, and is fixed in the operative position shown in FIGS. 1 and 3 by engagement of its opposite longitudinal edge with an opposite plate 35 also hinged to the casing.

In accordance with the present invention, the oscillating shaft 12 supports for oscillating movement therewith a plurality of cutter blades 40, 41 extending at an angle of from about two to ten degrees with respect to one another, i.e., at an angle of from about one to five degrees with respect to the axis of oscillation of the shaft and with respect to the longitudinal center line of the semi-cylindrical comb in contact with which the blades oscillate. As will be seen from FIGS. 1 and 2, the blades are disposed so that their converging ends are located at the same end of the casing as that at which the actuating means for oscillating the shaft is located.

The apex of the angle between the blades is located considerably beyond the converging ends of the blades, and actually beyond the corresponding end of the shaft 12. Desirably, the apex of the angle between the two blades is located at a point with respect to the axis of the oscillating shaft such that the distance between the blades at their closest point of convergence adjacent one end of the shaft will be about ⅛ of an inch, and the distance therebetween at the opposite end of the blades will be about ⁵⁄₁₆ of an inch.

In order to support the blades 40, 41 in the diverging relationship above set forth, for oscillation in a path in which the cutting edges of the blades contact with the inner surface of the comb, a series of sector-shaped plates or discs 44, 45, 46 and 47 are fixed to the shaft in spaced parallel relation to one another.

Each of these supporting plates or discs is provided with circumferentially spaced slots 44a; 44b; 45a; 45b; 46a; 46b; and 47a; 47b, each extending inward from the periphery of the respective discs toward the shaft. As will be seen, particularly from FIG. 5, the circumferential spacing of these slots progressively increases from a minimum on disc 44 to a maximum on disc 47. This progressive increase of the circumferential spacing between the slots is such that the longitudinal centers of the slots 44a, 45a, 46a and 47a are disposed in a common plane extending at an angle of from about one to five degrees with respect to the vertical plane of the axis of the shaft and the longitudinal center line of the comb in contact with which the blades oscillate, and the longitudinal centers of the other slots 44b, 45b, 46b, and 47b are similarly disposed in a common plane extending at an equal angle to that vertical plane but on the side thereof opposite to that on which the slots 44a, 45a, 46a and 47a are disposed. Thus, the blades 40, 41 inserted in the respective longitudinally aligned slots extend at an angle of from two to ten degrees with respect to one another.

Supporting disc 45 is formed with elongated openings 45c, 45d extending inwardly of and in alignment with the slots 45a, 45b, respectively, and supporting disc 46 is similarly provided with similar elongated slots 46c, 46d in alignment with the slots 46a, 46b thereof, respectively. The longitudinally aligned elongated openings in discs 45 and 46 are adapted to receive suitably spaced hooks 48 formed along the lower longitudinal edge of the blades 40, 41 when the blades are mounted on the supporting discs. Disc 44 is formed along its arcute periphery with an outwardly directed, right angularly extending lip 44f, and disc 47 is formed along its arcuate periphery with a similar outwardly directed lip 47f.

The blades are removably supported with their body portions positioned freely, though not loosely, in the diverging slots 44a, 45a, 46a, 47a and 44b, 45b, 46b, 47b of the supporting discs. They are yieldingly supported therein by means of a wire spring 50, of the form shown in FIG. 5, and having a midsection 51 for positioning in slots 45c, 46c (or 45d, 46d). The outer or leg portions 52 of each spring extend upwardly and outwardly at an angle with respect to the opposed ends of the portion 51 and are bent right-angularly at their ends as shown at 53. In assembling the spring with the supports, the bent portions are received in the slots of the end discs 44 and engaged under the lip 44f, 47f thereby holding the spring in correct position to receive the blade. When the blades are then inserted in the supports, the leg portions 52 are depressed, thereby being positioned for urging the blades upwardly for contact of their cutting edges with the inner surface of the comb.

As will be seen from FIG. 5, showing an exploded view of one of the blades, one of the springs, and the oscillatable shaft and blade supporting discs mounted thereon, the latter are shown as being preferably of arcuate (i.e., sector-shaped) dimension progressively increasing from that of disc 44 to that of disc 47. Also shown in the drawing is a counterweight 55 attached to a downwardly extending portion of support disc 47. The necessity for using, and the size of such a counterweight, however will be governed by the power of the motor used for driving the shaft, the length and rate of oscillation of the shaft, the length and weight of the blades and the size and weight of the blade supports.

Each of the blades is formed along its upper longitudinal margin with a series of narrow notches 57 suitably spaced, dimensioned, and having their side edges disposed angularly to receive and accommodate the ribs 33 on the comb during oscillation of the blades with their cutting edges in contact with the inner surface of the comb.

The angle of divergence between the blades in their operative position is such that the entire length of each of the blades will cross or traverse the longitudinal center line of the comb throughout the entire length of each blade during each direction of oscillation of each of the blades in the arc of oscillation thereof. Thereby, the cutting edge of each blade is caused to coact in the shaving operation, with the inner surface of the comb throughout the entire area of cutting surface of the latter.

In conjunction with the herein described angular disposition of the blades with respect to the oscillatable shaft, it is an important feature of the invention that the cutting face of the blades be made slightly convex along the two parallel cutting edges thereof, this convex curvature, as magnifiedly illustrated in FIG. 7, extending from end to end of each of the two parallel cutting edges of each blade. Likewise, it is a feature of the invention that the faces of the blades between the two cutting edges of each blade extend along a very slight helix or twisted line, as magnifiedly illustrated in FIGS. 8 and 9, in order that each cutting edge of each blade during the oscillatory movement thereof will move in direct surface contact with the concave inner surface of the comb. The arc of convex curvature of the cutting face of each blade, as well as the slight helical formation of the faces of each blade may be so slight as to be practically imperceptible to the naked eye. The arc of convex curvature of the cutting face will depend upon the degree of divergence of the blades from the axis of the oscillatable shaft and from the longitudinal center line of the semi-cylindrical comb, and the helical formation will depend, at any given degree of divergence of the blades, upon the arc of the concave surface of the comb traversed by the blades during the oscillation thereof. In practice, after each of the blades has been hollow ground to form the cutting face thereof and the latter has had the required but slight convex curvature imparted thereto, the cutting edges may be honed against a surface of the same arcuate formation as that of the inner surface of the comb, while oscillating the blades held at an angle to one another corresponding to that in which they will be disposed in the assembled shaver. This honing will impart to the cutting faces of the respective blades the slight helical formation referred to above, which serves to achieve shearing contact of each of the blades with the inner surface of the comb throughout the length and arcuate path of oscillation of each of the blades. As will now be evident, the aforesaid helical formation on one blade of a pair will be more or less a mirror image of that on the other blade of a pair. Consequently, in assembling the blades with a shaft 12 carrying the supporting members described above, there will be utilized one of each of such pairs, precaution being taken, such as by suitable distinguishing marks to assure placement of the appropriate one in the divergently aligned slots of the supporting members.

It is a feature and advantage of the invention that the cutting edges of the blades as thus formed and positioned in the blade supports are self-honed by the surface contact of the blade edges with the inner surface of the comb during oscillating movement of the blades in the use of the shaver.

Although I have shown and described a single blade disposed on each side of the axis of the oscillatable shaft and extending at an angle as above described with respect to the blade disposed on the opposite side of the axis of the shaft, it will be evident that the invention may also, if desired, be embodied in an arrangement having pairs of blades disposed on each side of the axis of the oscillatable shaft, one blade of each of these pairs extending at an angle as above described with respect to the corresponding blade of the pair disposed on the opposite side of the axis of the shaft. In such an arrangement the angle of divergence between a blade of the outermost pair disposed on one side of the axis and the corresponding outermost blade disposed on the opposite side thereof, may be at the higher end of the range of the angle of divergence hereinabove set forth, while the blades of the innermost pair diverge at a smaller angle within said range. Thus, the longitudinal center line of the comb will be traversed throughout the entire length of the innermost, if not also that of the outermost, blades disposed on each side of the axis of the shaft during each direction of oscillation of the blades in the arc of oscillation thereof. In this embodiment, as illustrated in FIGS. 12 and 13, pairs of blades 60, 62 and 61, 63, respectively, are disposed on each side of the axis of the oscillatable shaft. The blade-supporting discs 64, 65, 66 and 67 are slotted as indicated at 64a–64d, 65a–65d, 66a–66d, and 67a–67d, respectively, to receive the respective blades of each pair, the hooks along the lower edge of the blades being received in the respective interior slots of 65e–65h and 66e–66h of the discs 65, 66, respectively. As in the embodiment previously described, wire springs indicated at 70, are utilized for yieldingly urging the blades outward to their shearing position in contact with the inner face of the comb.

In FIG. 11 there is diagrammatically illustrated in a series of views progressing from top to bottom, the shearing or slicing of the hairs during oscillation of the blades constructed and positioned in the shaver in accordance with the invention. In the uppermost of these views is illustrated the initial contact of the angularly disposed blade 40 with a hair extending or protruding inwardly into the interior of the comb, adjacent one portion of the periphery of an opening 31 therein. As the blade continues its movement in contact with the inwardly protruding hair, the latter is pushed ahead by the cutting edge toward the diametrically opposite portion of the periphery of the opening. By reason of the angular disposition of the blade, however, the cutting edge simultaneously moves the hair at an angle toward one side of the aforementioned diametrically opposite portion of the periphery of the opening. In so doing, the cutting edge is drawn angularly across the hair, thereby exerting a slicing or shearing action thereon.

In contradistinction to the foregoing action of the blades in the construction according to the invention, a squeezing or pinching action is exerted by blades positioned with their cutting edges disposed in parallelism to the axis of oscillation of the blade. As diagrammatically illustrated in the series of views composing comparative FIG. 10, the blade in that case acts to push the hair along substantially a straight line toward the peripheral portion of the opening in the comb diametrically opposite the peripheral portion thereof at which the blade makes initial contact with the hair. Thus, when the leading side of the hair reaches the opposite peripheral portion of the opening, the hair begins to become squeezed or pinched between the edge of the blade and the periphery of the opening. This squeezing or pinching of the hair continues during the continued movement of the blade in the same direction, until finally, the hair is severed by the squeezing or pinching action.

What is claimed is:

1. In an electric shaver of the type comprising a casing having a transversely arcuate comb, and cutter blades held in supports mounted on a shaft disposed in the casing and oscillatable from the shaft of a motor mounted in said casing, the improvement which comprises a semi-cylindrical comb and a plurality of blade supporting members mounted interiorly thereof in spaced relation to each other along an oscillatable shaft, each of said blade supporting members having circumferentially spaced blade-receiving slots each extending in a direction inwardly from the periphery thereof toward said oscillatable shaft, the circumferential spacing of said slots gradually increasing from that on the supporting member mounted proximate one end of said oscillatable shaft to that on the supporting member mounted proximate the opposite end of said oscillatable shaft, said slots on each of the respective supporting members being disposed in planes extending at an angle of from two to ten degrees with respect to one another from said one end of said oscillatable shaft to said opposite end thereof so that cutter blades received in the angularly aligned slots of said supporting members will be disposed at an angle of about one to five degrees with respect to the longitudinal center line of said comb.

2. The improvement defined in claim 1, wherein each of said blade supporting members is provided with pairs of circumferentially spaced blade-receiving slots disposed on each side of the axis of said oscillatable shaft, the slots of the pair on one side of said axis being each disposed in planes extending at an angle of from one to five degrees with respect to the corresponding slot of the pair on the other side of said axis.

3. In an electric shaver, the combination of a semi-cylindrical comb having hair receiving openings therein, an oscillatable shaft disposed below said comb, blade supporting members spaced from one another along said shaft, each of said blade supporting members having circumferentially spaced blade-receiving slots each extending in a direction inwardly from the periphery thereof toward said oscillatable shaft, the circumferential spacing of said slots gradually diverging from that on the supporting member mounted proximate one end of said oscillatable shaft to that on the supporting member mounted proximate the opposite end of said oscillatable shaft, said slots on each of the respective supporting members being disposed in planes extending at an angle of from two to ten degrees with respect to one another from said one end of said shaft to said opposite end thereof, cutting blades removably received in the respective longitudinally aligned slots in said supporting members so as each to be disposed at an angle of from one to five degrees with respect to the longitudinal center line of said comb, said blades having their respective cutting faces contoured for direct surface contact with the concave inner surface of said comb during the oscillatory movement of said blades, and springs removably engageable with said supporting members and positioned for yieldingly urging each of said blades outwardly to bring their cutting edges into shearing contact with the inner surface of said comb.

4. In an electric shaver, the combination set forth in claim 3, wherein the cutting face of each of said blades has parallel cutting edges and is formed along a slight arc of convex contour extending longitudinally from one end of the blade to the other end thereof, the convexity of said arc being related to the angle of divergence of said blades so that the cutting face of each blade will be in surface contact with the inner surface of said comb during the oscillatory movement of the blades.

5. In an electric shaver, the combination set forth in claim 4, and wherein the said cutting face of each blade between said parallel cutting edges thereof is of slight helical outline longitudinally thereof, said helical outline being related to said convexity of said arc so that the cutting face of each blade will traverse the longitudinal center line of said comb throughout the length of each blade during each direction of oscillation of each blade in the arc of oscillation thereof.

6. In an electric shaver, the combination set forth in claim 3, and wherein said blades are disposed so as to traverse the longitudinal center line of said comb throughout the length of each blade during each direction of oscillation of each blade in the arc of oscillation thereof.

7. In an electric shaver, the combination set forth in claim 4, and wherein the said cutting face of each blade between said parallel cutting edges thereof is of slight helical outline longitudinally thereof, said helical outline being related to said convexity of said arc so as to maintain said direct surface contact during the oscillatory movement of the blades.

References Cited by the Examiner
UNITED STATES PATENTS

| | | | |
|---|---|---|---|
| 2,331,500 | 10/1943 | Rand | 30—43.9 |
| 2,726,445 | 12/1955 | Winther | 30—43.9 |
| 2,828,539 | 4/1958 | Winther | 30—43.9 |
| 2,917,825 | 12/1959 | Winther | 30—43.9 |
| 2,931,099 | 4/1960 | Schell | 30—43.9 |
| 2,935,788 | 5/1960 | Kleinman | 30—43.9 |

WILLIAM FELDMAN, *Primary Examiner.*

MYRON C. KRUSE, *Examiner.*